US006957271B1

(12) United States Patent
Shimada (10) Patent No.: US 6,957,271 B1
(45) Date of Patent: Oct. 18, 2005

(54) NODE CAPABLE OF SAVING A THIRD LAYER PACKET HANDLING OPERATION IN A SYNCHRONOUS OPTICAL NETWORK

(75) Inventor: Naohiro Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/506,215

(22) Filed: Feb. 17, 2000

(30) Foreign Application Priority Data

Feb. 18, 1999  (JP) ................................. 11/039491

(51) Int. Cl.⁷ .......................................... G06F 15/173
(52) U.S. Cl. .................. 709/238; 370/395.51
(58) Field of Search ................. 370/395.51, 911, 370/903, 902, 907, 419, 427, 254–258; 709/236, 709/238, 245, 217–219; 710/38; 398/45–57

(56) References Cited

U.S. PATENT DOCUMENTS

| 5,537,393 A | * | 7/1996 | Shioda et al. ............ 370/16.1 |
| 5,805,568 A | * | 9/1998 | Shinbashi .................. 370/223 |
| 6,169,754 B1 | * | 1/2001 | Sugawara et al. .......... 370/535 |
| 6,256,292 B1 | * | 7/2001 | Ellis et al. ................ 370/227 |
| 6,256,326 B1 | * | 7/2001 | Kudo ....................... 370/512 |

FOREIGN PATENT DOCUMENTS

| JP | 9-172457 | 6/1997 |
| JP | 10-136016 | 5/1998 |
| JP | 10-294737 | 11/1998 |
| JP | 138687 | 5/2000 |

OTHER PUBLICATIONS

Yuhei Iwasaki, "New LAN Introduction Method 9, Layer 3 Switch Construction," Computer & Network LAN, vol. 16, No. 6, Ohm Company, Limited, pp. 87-90, Jun. 1998.
Hiroshi Esaki: "High Speed Routing Technique and Multilayer Switch Technique," BIT, vol. 30, No. 5, Kyoritsu Publishing Company, Limited, pp. 83-91, May, 1998.
Yuhei Iwasaki, "New LAN Introduction Method 11, Cut-through Layer 3 Switch Construction," Computer & Network LAN, vol. 16, No. 9, Ohm Publishing Company, Limited, pp. 57-61, Sep. 1998.

* cited by examiner

Primary Examiner—Beatriz Prieto
(74) Attorney, Agent, or Firm—Dickstein, Shapiro, Morin & Oshinsky, LLP.

(57) ABSTRACT

In a node having first, second, and third layers, a packet (or a cell) is mapped in the first layer. The first layer judges whether the packet (or the cell) is to be dropped at the node or to be hopped to a next node. The first layer transmits the packet to the third layer through the second layer when the first layer judges that the packet is to be dropped at the node. The first layer transmits, when the first layer judges that the packet is to be hopped to the next node, the packet to the next node by making the packet cut through the first layer.

2 Claims, 9 Drawing Sheets

FIG. 1B PRIOR ART
HOP-BY-HOP TYPE

FIG. 1A PRIOR ART
MESH TYPE

NODE CAPABLE OF SAVING A THIRD LAYER PACKET HANDLING OPERATION IN A SYNCHRONOUS OPTICAL NETWORK

BACKGROUND OF THE INVENTION

This invention relates to a cut-through transmission apparatus and a cut-through transmission method for use in a node included in a communication network.

In recent years, the internet traffic is rapidly increased. The internet traffic is carried by IP (Internet Protocol) packets which are transferred under control of a router. Following the rapid increase in internet traffic, there is a growing demand for improvement in function and performance of the router. Since most of transferred data are important data for business use, a strict demand is imposed upon the reliability, the quality, and the security. On the other hand, there arises an increasing demand for a virtual private network, such as an internet VPN service, connecting a plurality of sites or nodes.

In order to meet the above-mentioned demands, one approach is to make the router have a high performance and a full of additional functions. However, this approach has a limit. There remains a problem how to realize the above-mentioned demands in an IP packet network in association with an existing transmission network.

As the existing transmission network, there are known an SDH (Synchronous Digital Hierarchy) network, an ATM (Asynchronous Transmission Mode) network, a WDM (Wavelength Division Multiplexing) network, and PDH (Plesiochronous Digital Hierarchy) network. By integrating the existing transmission network and the IP packet network transmitting the internet traffic and by complementing their characteristics with each other, it is expected to achieve an improved system having more efficient transmission characteristics.

Consideration will be made about conventional network structures for LAN-to-LAN connection.

Figure 1A:
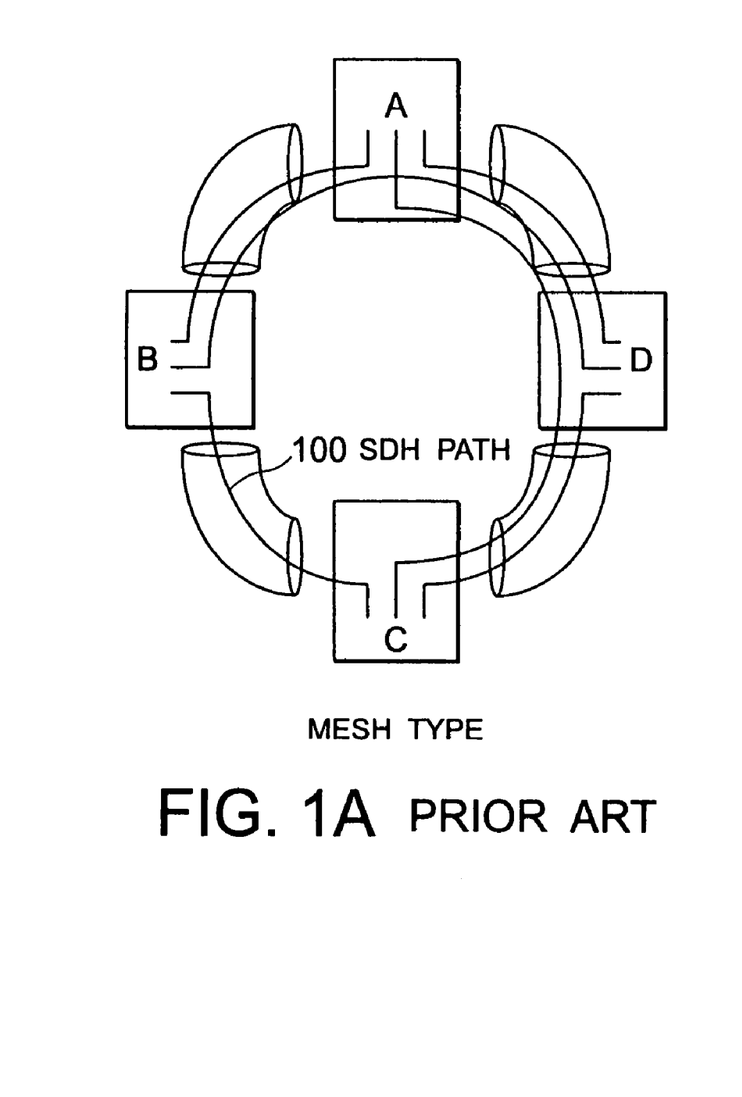
FIGS. 1A and 1B are schematic diagrams showing existing LAN-to-LAN connections of a mesh type and a hop-by-hop type, respectively.

Referring to FIG. 1A, four nodes A through D are connected through a plurality of SDH paths 100 in a point-to-point connection. Specifically, the SDH paths 100 as private lines are provided between the nodes A and B, between the nodes A and C, between the nodes A and D, between the nodes B and C, between the nodes B and D, and between the nodes C and D, respectively. This network structure called a mesh type is disadvantageous in that a large number of SDH paths (private lines) are required.

Figure 1B:
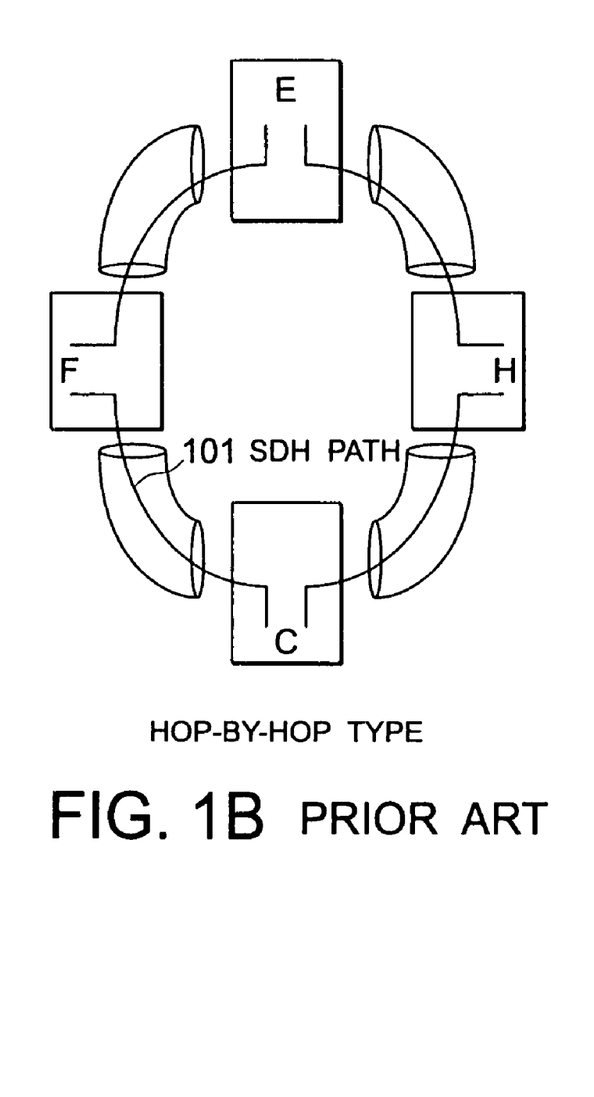

Referring to FIG. 1B, four nodes E, F, G, and H are connected through an IP packet network of a hop-by-hop connection. Specifically, a plurality of SDH paths 101 as private lines are provided between the nodes E and F, between the nodes F and G, between the nodes G and H, and between the nodes H and E. In addition, each of the nodes E, F, G, and H has a router function to execute a routing operation.

Figure 2:
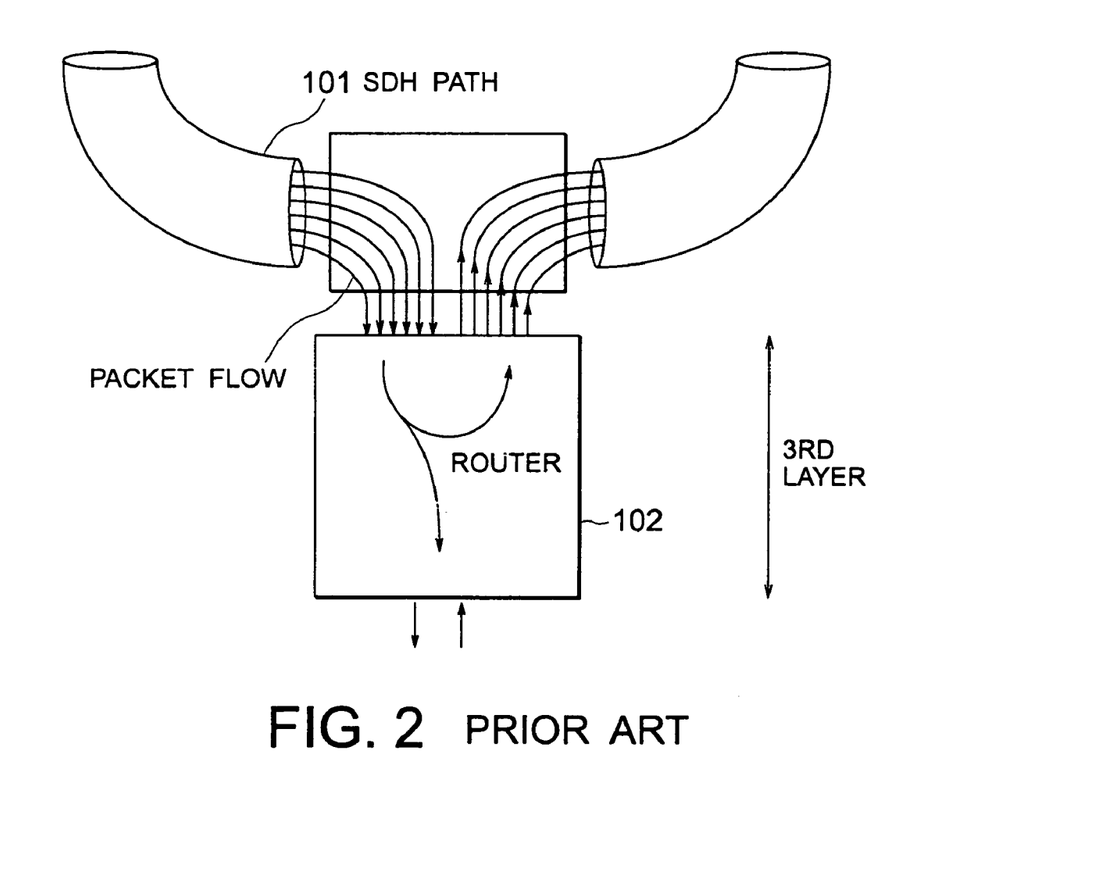
FIG. 2 is a schematic diagram showing an operation at a node in the existing hop-by-hop connection illustrated in FIG. 1B.

Referring to FIG. 2, a router 102 performs the routing operation as a third-layer operation. Specifically, the router 102 individually identifies all packets flowing into the router 102 to judge whether each packet is to be dropped at this node or to be hopped to a next node.

In order to execute the routing operation, the router 102 is required to have a number of functions. Thus, a heavy load is imposed upon the router 102.

Specifically, the router 102 is required to have a large routing table including routing information for all packets flowing into the router 102 and to have a high performance so as to search such a large routing table.

In addition, in order to interface the SDH paths (the private lines) in the form of DS-1 (Digital Signal Level 1), the router 102 is required to have a path terminating function of terminating VT (Virtual Tributary level) 1.5.

Since all of the packets are sent to a third layer after being subjected to the above-mentioned operations, a processing delay is produced also for those packets which are to be hopped to the next node and need not be processed at this node. This results in significant degradation of a network performance as a whole.

Thus, packet transfer in the above-mentioned IP packet network is disadvantageous in that the third-layer operation, i.e., the routing operation inevitably gives the heavy load.

For example, Japanese Unexamined Patent Publication (JP-A) No. H10-136016 (136016/1998) discloses a packet transfer control method which is capable of shortening a time required for a router to create a private cut-through path for a particular end flow.

The operation of the above-mentioned packet transfer control method is as follows. It is assumed that, in order to transfer a packet flow defined by a relatively abstract (general) condition such as a destination network address, a first cut-through path is preliminarily established from a first router to a second router which is not adjacent to the first router. In this state, it is assumed that a second cut-through path is required to be established to transfer a packet flow defined by a more specific (detailed) condition such as a source/destination address pair and a destination port number. In this event, control messages for establishment of the second cut-through path are exchanged between the first router and the second router as an endpoint of the first cut-through path. Thus, the second cut-through path is established by the use of the first cut-through path.

In the above-mentioned packet transfer control method, cut-through connection is established by the router. As a result, an operation load imposed upon the router is not reduced.

On the other hand, Japanese Unexamined Patent Publication (JP-A) No. H10-294737 (294737/1998) proposes a packet transfer apparatus which is capable of reducing a delay which is produced upon start of transfer of a best-effort flow and required to establish a connection between the packet transfer apparatus and another packet transfer apparatus.

In the packet transfer apparatus, each router containing a switch monitors a time duration of the flow. If the flow continues for a long time, a cut-through connection is established by switching and assigned to the flow. If the flow continues for a much longer time, a short-cut connection using an ATM connection is established and assigned to the flow. Thus, a basic router is avoided.

In the above-mentioned packet transfer apparatus also, cut-through connection is established by the router, like in Japanese Unexamined Patent Publication (JP-A) No. H10-136016. As a result, the operation load imposed upon the router is not reduced.

Japanese Unexamined Patent Publication (JP-A) No. H09-172457 (172457/1997) proposes a packet transmission node apparatus which is capable of establishing cut-through connection selectively for a traffic expected to have a relatively large amount of communication after establishment of the cut-through connection.

In the packet transmission node apparatus, a node which can be a starting point or an end point of the cut-through connection refers to, before transmission or after reception of a packet, not only information of a network layer of the packet but also at least one of source information and destination information of a transport layer. If it is judged as a result of the reference that establishment of the cut-through connection is worthwhile, initiation of connection establishment is triggered by the packet.

In the packet transmission node apparatus, the cut-through connection is established not in the router but in the node. Therefore, the load upon the router is reduced. However, since the various kinds of information must be referred to as mentioned above, packet transmission inevitably requires a complicated operation.

SUMMARY OF THE INVENTION

It is an object of this invention to provide a cut-through transmission apparatus (or a node) which is capable of remarkably saving a third-layer operation, i.e., a routing operation.

It is another object of this invention to provide a cut-through transmission method which is capable of remarkably saving a third-layer operation, i.e., a routing operation.

According to this invention, there is provided a node comprising first, second, and third layers, wherein:
 a packet is mapped in the first layer;
 the first layer judging whether the packet is to be dropped at the node or to be hopped to a next node;
 the first layer transmitting the packet to the third layer through the second layer when the first layer judges that the packet is to be dropped at the node.

The first layer transmits, when the first layer judges that the packet is to be hopped to the next node, the packet to the next node by making the packet cut through the first layer.

According to this invention, there is also provided a node comprising first, second, and third layers, wherein:
 the second layer judges, without terminating the first layer, whether a packet supplied from the first layer is to be dropped at the node or to be hopped to a next node;
 the second layer transmitting the packet to the third layer when the second layer judges that the packet is to be dropped at the node.

The second layer transmits, when the second layer judges that the packet is to be hopped to the next node, the packet to the next node by making the packet cut through the second layer.

According to this invention, there is also provided a node comprising first, second, and third layers, wherein:
 the second layer transmits, when a packet supplied from the first layer is not to be dropped at the node, the packet to a next node by making the packet cut through the second layer without terminating the first layer;
 the second layer transmitting the packet to the third layer when the packet is to be dropped at the node.

According to this invention, there is also provided a node comprising first, second, and third layers, wherein:
 if packets to be dropped and not to be dropped at the node are both contained in a transmission path, the second layer monitors all packets in the transmission path to transmit, when the packet is not to be dropped at the node, the packet to a next node by making the packet cut through the second layer and to transmit the packet to the third layer when the packet is to be dropped at the node.

According to this invention, there is also provided a transmission apparatus comprising:
 a time slot extracting section for converting an input optical signal supplied through a first point into an input electric signal and for selecting among time slots in a transmission path of the input electric signal a particular time slot which includes a packet to be dropped at a second point;
 a drop packet extracting section for monitoring all packets in the particular time slot selected in the time slot extracting section to identify whether or not each packet is to be dropped at the second point;
 an add packet inserting section for packet-multiplexing the packet not to be dropped at the second point and a packet inserted at the second point to produce a packet-multiplexed packet; and
 a signal transmitting section for inserting into an appropriate time slot of the transmission path the packet-multiplexed packet to be sent to a third point, converting an output electric signal including the transmission path into an output optical signal, and delivering the output optical signal to the third point.

According to this invention, there is also provided a transmission method carried out in a node comprising first, second, and third layers, comprising the steps of:
 judging, in the first layer where a packet is mapped, whether the packet is to be dropped at the node or to be hopped to a next node; and
 transmitting in the first layer the packet to the third layer through the second layer when the first layer judges that the packet is to be dropped at the node.

The transmission method may further comprise the step of:
 transmitting in the first layer, when the first layer judges that the packet is to be hopped to the next node, the packet to the next node by making the packet cut through the first layer.

According to this invention, there is also provided a transmission method carried out in a node comprising first, second, and third layers, comprising the steps of:
 judging in the second layer, without terminating the first layer, whether a packet supplied from the first layer is to be dropped at the node or to be hopped to a next node; and
 transmitting in the second layer the packet to the third layer when the second layer judges that the packet is to be dropped at the node.

The transmission method may further comprise the step of:
 transmitting in the second layer, when the second layer judges that the packet is to be hopped to the next node, the packet to the next node by making the packet cut through the second layer.

According to this invention, there is also provided a transmission method carried out in a node comprising first, second, and third layers, comprising the steps of:
 transmitting in the second layer, when a packet supplied from the first layer is not to be dropped at the node, the packet to a next node by making the packet cut through the second layer without terminating the first layer; and
 transmitting in the second layer the packet to the third layer when the packet is to be dropped at the node.

According to this invention, there is also provided a transmission method carried out in a node comprising first, second, and third layers, comprising the step of:
 monitoring in the second layer, if packets to be dropped and not to be dropped at the node are both contained in a transmission path, all packets in the transmission path to transmit, when the packet is not to be dropped at the node, the packet to a next node by making the packet cut through the second layer and to transmit the packet to the third layer when the packet is to be dropped at the node.

According to this invention, there is also provided a transmission method comprising the steps of:

converting an input optical signal supplied through a first point into an input electric signal;

selecting among time slots in a transmission path of the input electric signal a particular time slot which includes a packet to be dropped at a second point;

monitoring all packets in the particular time slot selected in the selecting step to identify whether or not each packet is to be dropped at the second point;

packet-multiplexing the packet not to be dropped at the second point and a packet inserted at the second point to produce a packet-multiplexed packet;

inserting into an appropriate time slot of the transmission path the packet-multiplexed packet to be sent to a third point, converting an output electric signal including the transmission path into an output optical signal; and delivering the output optical signal to the third point.

An ATM cell may be used instead of the packet.

DESCRIPTION OF THE PREFERRED EMBODIMENTS

Herein, the term "cut-through" represents a connection in which the operation in the third layer is omitted by some means even if a hop-by-hop connection is normally required, i.e., a connection in which packet transfer is carried out from one logical network to another logical network only by the operation in a layer lower than the third layer.

In the cut-through transmission apparatus or the cut-through transmission method according to this invention, judgement about whether a packet is to be dropped at a current node or to be hopped to a next node and an operation following the judgement are not carried out in the third layer individually for all packets. Instead, the judgement and the execution are carried out in the first layer where the packet is mapped ("cut-through 1" which A will later be described). Alternatively, the judgement and the operation are carried out in the second layer without terminating the first layer ("cut-through 2" which will later be described).

Figure 3:
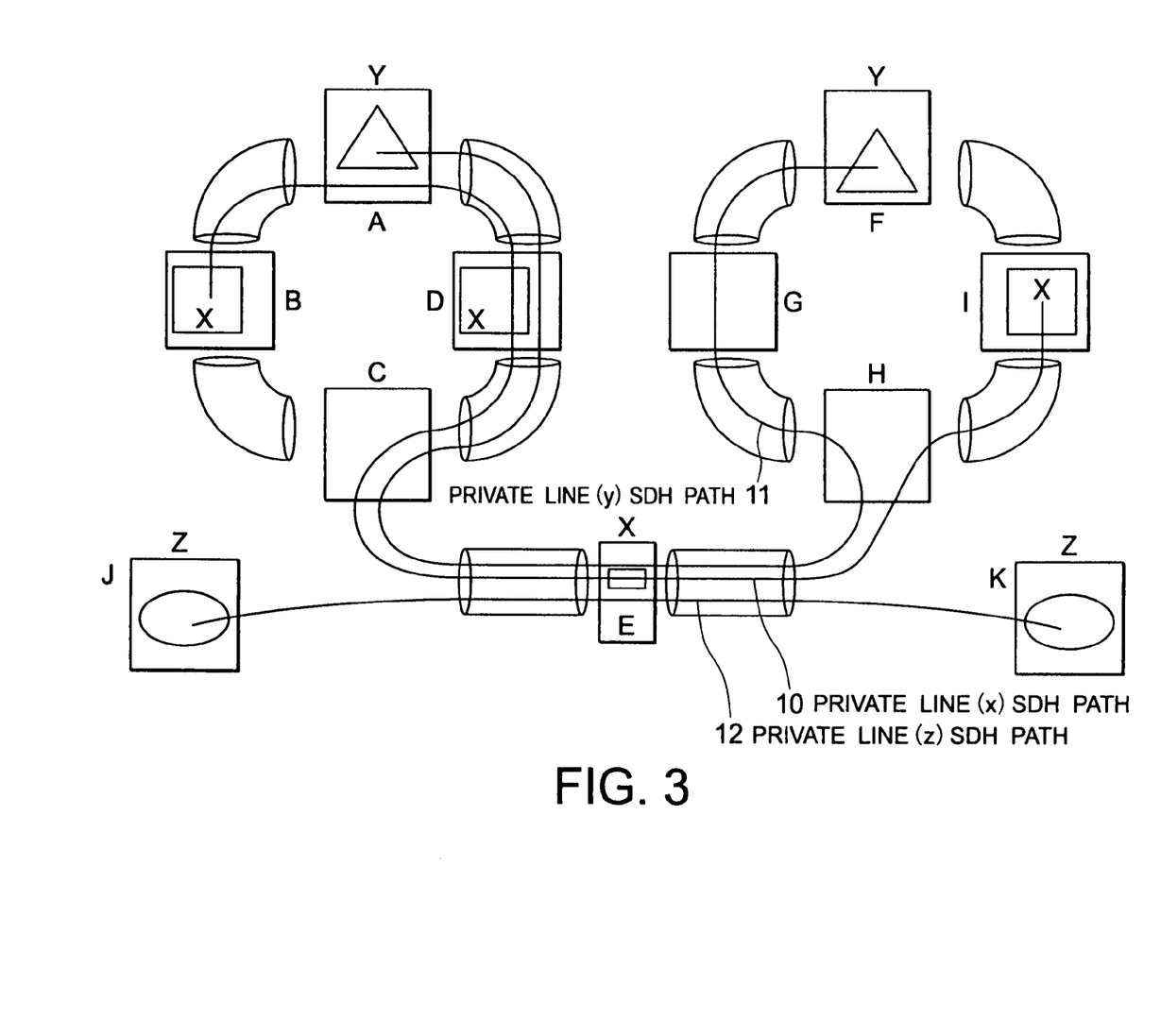
FIG. 3 is a schematic diagram showing a specific example of a network using a cut-through transmission apparatus or a cut-through transmission method according to this invention.

Referring to FIG. 3, a plurality of points are labelled A, B, C, D, E, F, G, H, I, J, and K. X Corporation has four offices at the points B, D, E, and I. A private line (x) SDH path 10 passes through the points B, A, D, C, E, H, and I. Thus, the private line (x) SDH path 10 passes through all of the four offices of X Corporation at the points B, D, E, and I. On the other hand, Y Corporation has two offices at the points A and F. A private line (y) SDH path 11 passes through the points A, D, C, E, H, G, and F. Thus, the private line (y) SDH path 11 passes through the two offices of Y Corporation at the points A and F. Furthermore, Z Corporation has two offices at the points J and K. A private line (z) SDH passes through the points J, E, and K. Thus, the private line (z) SDH path 12 passes through the two offices of Z Corporation at the points J and K.

The private line (y) SDH path 11 is a private line connected in a point-to-point connection of an existing type. Therefore, the private line (y) SDH path 11 can not be accessed, for example, from the point D or E as an intermediate point.

On the other hand, the private line (x) SDH path 10 is a private line established according to this invention. The private line (x) SDH path 10 can be accessed also at the point D or E as the intermediate point.

According to this invention, packets of Y Corporation and Z Corporation can be cut through at the point E on the private line (y) SDH path 11 and the private line (z) SDH path 12 because these packets need not be dropped at the point E. Similarly, packets transferred from the point D to the point I can be cut through at the point E on the private line (x) SDH path 10 because these packets need not be dropped at the point E. Hereinafter, the private line (x) SDH path or the like will be referred to as a shared SDH path.

In this case, the private line (x) SDH path 11, the private line (y) SDH path 11, and the private line (z) SDH path 12 can coexist in a same network.

Thus, in the cut-through transmission apparatus or the cut-through transmission method according to this invention, packets to be hopped to a next node are cut through in the first layer or the second layer. Therefore, only those packets to be dropped at this node are sent to the third layer. Thus, it is possible to considerably save the third-layer operation, i.e, the routing operation.

In case where the packets are cut through in the second layer, the cut-through is carried out without terminating the first layer. Therefore, a large amount of operation required to terminate the first layer (for example, pointer processing upon termination of VT1.5) becomes unnecessary. As a result, it is possible to considerably save functional operations.

The packets to be cut through are processed in the first or the second layer. In addition, the above-mentioned saving in functional operations makes it possible to minimize the delay. Thus, an end-to-end network performance is remarkably improved.

The cut-through inhibits the communication from being accessed at that point. Therefore, the security is assured.

Figure 4:
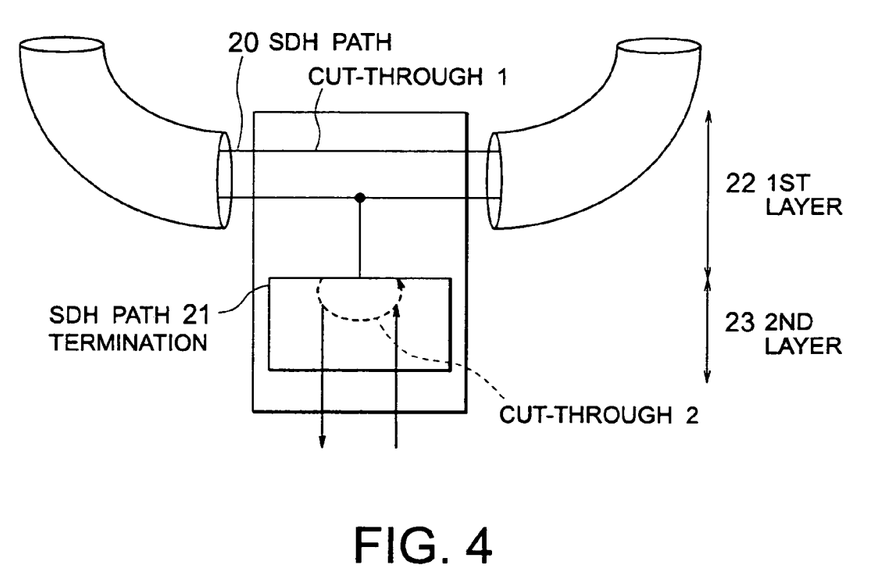
FIG. 4 is a schematic diagram showing a cut-through type node using the cut-through transmission apparatus of this invention.

Referring to FIG. 4, description will be made about a cut-through node using a cut-through transmission apparatus according to a first embodiment of this invention.

The cut-through node of the first embodiment is called a "cut-through 1" node.

In this embodiment, each of a plurality of SDH paths 20 is taken as a single unit for which a closed user group (CUG) is preliminarily formed.

In FIG. 4, an upper one of the SDH paths 20 does not carry any packet to be dropped at the cut-through node. In this event, the SDH path 20 is not terminated and packets on the SDH path 20 are made to pass through to a next node (cut-through 1).

In this method, not only the termination of the SDH path (for example, VT1.5) but also the operation in a second layer 23 or a third layer 24 (FIG. 5) become unnecessary. Therefore, it is possible to save a considerable amount of functions.

Furthermore, a packet delay at this node includes no more than a delay required for the packets on the SDH path 20 to pass through a first layers 22. Thus, the packets can pass through this node without any substantial delay.

Turning back to FIG. 3, the cut-through node will be described in conjunction with the specific example.

At the point E, the packets of Y Corporation and Z corporation need not be dropped. Therefore, at the point E, the private line (y) SDH path 11 or the private line (z) SDH path 12 need not be subjected to any operation at all. The cut-through is executed by the private line (x) SDH path 10 alone.

Figure 5:
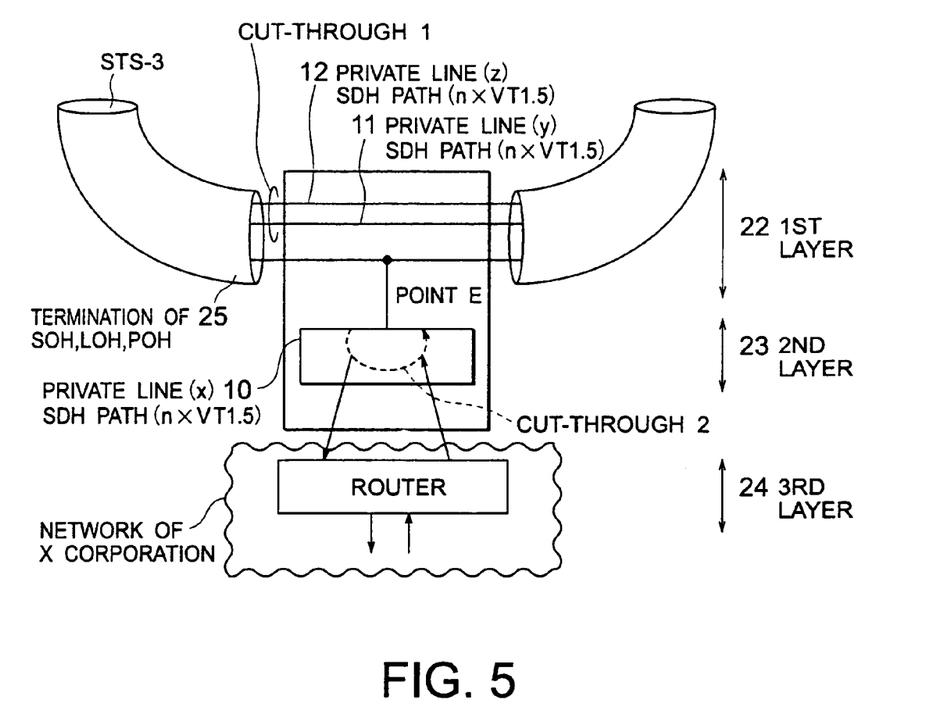
FIG. 5 is a schematic diagram showing a specific example of the cut-through type node illustrated in FIG. 4.

Referring to FIG. 5, the private line (x) SDH path 10 has a throughput of n×VT1.5 (n being an arbitrary natural number corresponding to a necessary band). For each unit of n×VT1.5, the private line (y) SDH path 11 or the private line (z) SDH path 12 is subjected to "cut-through (pass-through) 1".

In this case, it is only necessary to terminate a section overhead (SOH), a line overhead (LOH), and a path overhead (POH) as depicted by a reference numeral 25. Termination of VT1.5 is unnecessary. Therefore, the cut-through can be realized with a very simple structure.

Turning back to FIG. 4, description will be made about a cut-through node using a cut-through transmission apparatus according to a second embodiment of this invention.

The cut-through node of this embodiment is called a "cut-through 2" node.

In the cut-through 2, if a particular SDH path 20 contains packets to be dropped and not to be dropped at this node, all packets contained in the SDH path 20 are monitored in the second layer 23. The packets not to be dropped are cut through in the second layer 23 to the next node.

In the cut-through 2 also, the SDH path 20 is not terminated and cut through to the next node in the manner similar to the cut-through 1, as depicted by a dotted line in FIG. 4.

In this embodiment, the cut-through is possible without requiring the function of terminating the SDH path (for example, VT1.5). In addition, the operation in the third layer 24 (FIG. 5) is not necessary at all. Thus, a considerable amount of functions can be saved.

A packet delay at this node includes no more than a delay required for the packets to pass through the second layer 23. Therefore, the packets can pass through this node with a relatively small delay.

Referring again to FIG. 3, the cut-through node will be described in conjunction with the specific example.

Among a group of packets sent through the private line (x) SDH path 10, those packets sent from the point D to the point I need not be dropped at the point E. Therefore, those packets are cut through in the second layer 23 without being sent to the third layer 24.

In FIG. 5, the SDH path 10 has a throughput of n×VT1.5 (n being an arbitrary natural number corresponding to a necessary band). In the SDH path 10 of n×VT1.5, only those packets to be dropped at this node are subjected to "cut-through (packet through) 2".

In this case also, it is only necessary to terminate the section overhead (SOH), the line overhead (LOH), and the path overhead (POH) as depicted by the reference numeral 25, in the manner similar to the "cut-through 1". The termination of the VT1.5 is unnecessary. Therefore, the cut-through is realized with a very simple structure.

In the example illustrated in FIG. 5, an input signal is decomposed into a level of VT1.5. At that level, necessary time slots are selected. Instead of VT1.5, use may be made of VT2, VT3, VT6, STS-1, STS-3 (STM-1), STS-12 (STM-4), STS-48 (STM-16), or STS-192 (STM-64).

The whole of the necessary band can includes a multiple of a single sort of band. Alternatively, use may be made of a mixture of VT1.5 and STS-1.

Furthermore, in addition to a variety of different sorts of bands in the SDH path as mentioned above, use can be made of a complex thereof. Specifically, selection is made of an n multiple of a single sort of band, a mixture of different sorts of bands, and a combination thereof. In other words, time slots can be desiredly combined to be used as a cut-through managing unit.

Figure 6:
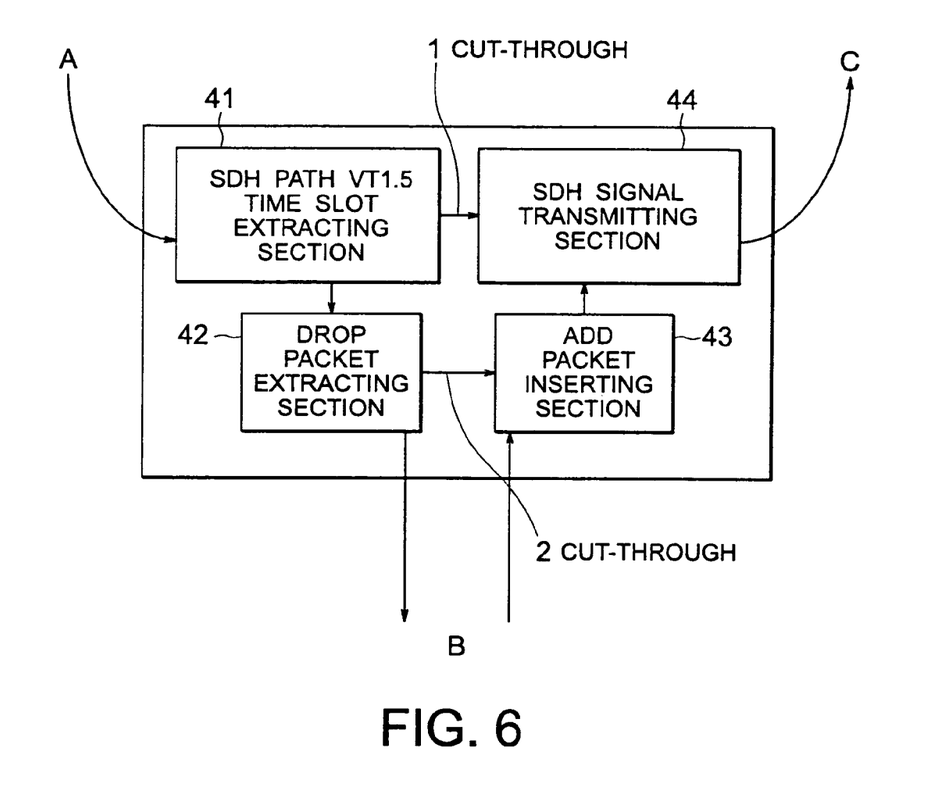
FIG. 6 is a block diagram showing the structure of the cut-through transmission apparatus of this invention.

Referring to FIG. 6, a cut-through transmission apparatus according to a third embodiment of this invention will be described. In the figure, one transmission path alone is illustrated.

The cut-through transmission apparatus of this embodiment comprises a SDH path VT1.5 time slot extracting section 41 for converting an input optical signal supplied through a point A into an input electric signal and for selecting among time slots in an input SDH path a particular time slot including a packet to be dropped or to be added at a point B, a drop packet extracting section 42 for monitoring all packets in the particular time slot selected by the SDH path VT1.5 time slot extracting section 41 to identify whether or not each packet is to be dropped at the point B, an add packet inserting section 43 for packet-multiplexing a packet not to be dropped at the point B and a packet to be inserted at the point B to produce a packet-multiplexed packet, and an SDH signal transmitting section 44 for inserting the packet-multiplexed packet to be sent to a point C into an appropriate time slot, establishing an output SDH path, converting an output electric signal into an output optical signal, and delivering the output optical signal to the point C.

The cut-through transmission apparatus according to this embodiment is operated as follows.

The input optical signal inserted through the point A is converted by the SDH path VT1.5 time slot extracting section 41 into the input electric signal. Among the time slots in the SDH frame, selection is made of the particular time slot including the packet to be dropped or to be added at the point B. In this embodiment, the time slot is extracted at a level of n×VT1.5 as a single path.

Each unselected time slot includes only those packets which need not be dropped at the point B (this node) or will include those packets to be added at the point B (this node). The unselected time slot is sent from the SDH path VT1.5 time slot extracting section 41 to the SDH signal transmitting section 44 and then from the SDH signal transmitting section 44 to the point C.

When the unselected time slot is sent from the SDH path VT1.5 time slot extracting section 41 to the SDH signal transmitting section 44, the above-mentioned cut-through 1 is carried out as illustrated in FIG. 6.

On the other hand, the selected time slot includes the packets to be dropped or will include the packets to be added. The drop packet extracting section 42 monitors all of the packets in the selected time slot to identify whether or not each packet is to be dropped at the point B. If a particular packet is identified as a drop packet to be dropped at the point B, the drop packet is sent to the point B.

On the other hand, if the particular packet is identified as a non-drop packet not to be dropped at the point B, the non-drop packet is sent from the drop packet extracting section 42 to the add packet inserting section 43. The add packet inserting section 43 packet-multiplexes the non-drop packet with an add packet to be inserted at the point B to produce a packet-multiplexed packet.

When the non-drop packet is sent from the drop packet extracting section 42 to the add packet inserting section 43, the above-mentioned cut-through 2 is carried out as illustrated in FIG. 6.

The packet-multiplexed packet produced by the add packet inserting section 43 is sent to the SDH signal transmitting section 44. The SDH signal transmitting section 44 inserts the packet-multiplexed packet into an appropriate time slot. After an output SDH frame is restructured in the above-mentioned manner, the SDH signal transmitting section 44 converts an output electric signal into an output optical signal and delivers the output optical signal to the point C.

Figure 7:
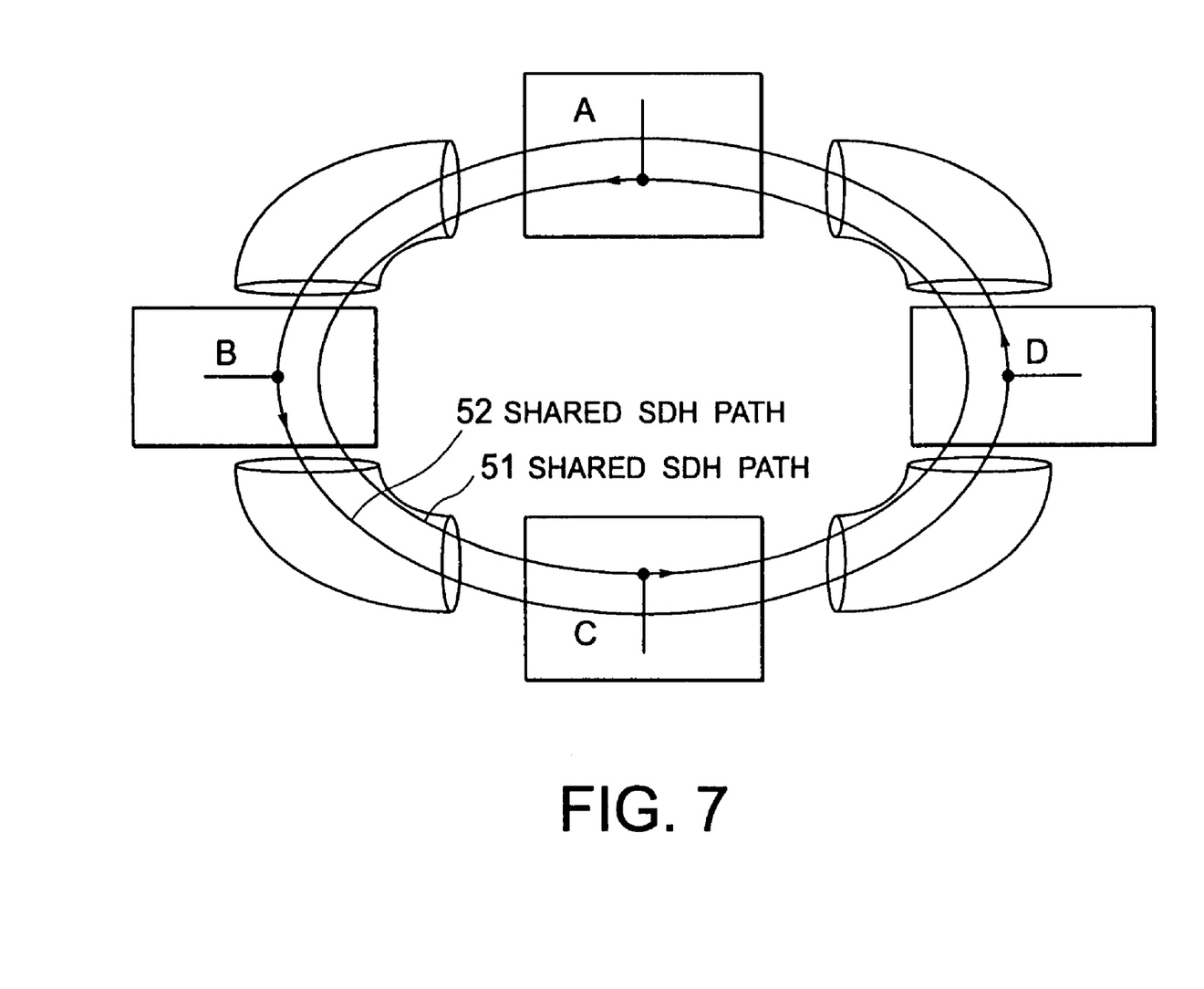
FIG. 7 is a schematic diagram showing a ring to which the cut-through transmission apparatus of this invention is applied.

Referring to FIG. 7, a cut-through transmission apparatus according to a fourth embodiment of this invention will be described. In this embodiment, the cut-through transmission apparatus is applied to a ring.

In this embodiment, a first shared SDH path 51 is accessible at two points A and C. A second shared SDH path 52 is accessible at two points B and D.

For example, at each of the points A and C, the cut-through 2 and the cut-through 1 are applied to the first shared SDH path 51 and the second shared SDH path 52, respectively. On the contrary, at the points B and D, the cut-through 1 and the cut-through 2 are applied to the first shared SDH path 51 and the second shared SDH path 52, respectively.

In the example illustrated in FIG. 7, the number of nodes may be increased. To each of additional nodes, the cut-through transmission apparatus is applicable in the manner similar to the point A or B.

Figure 8:
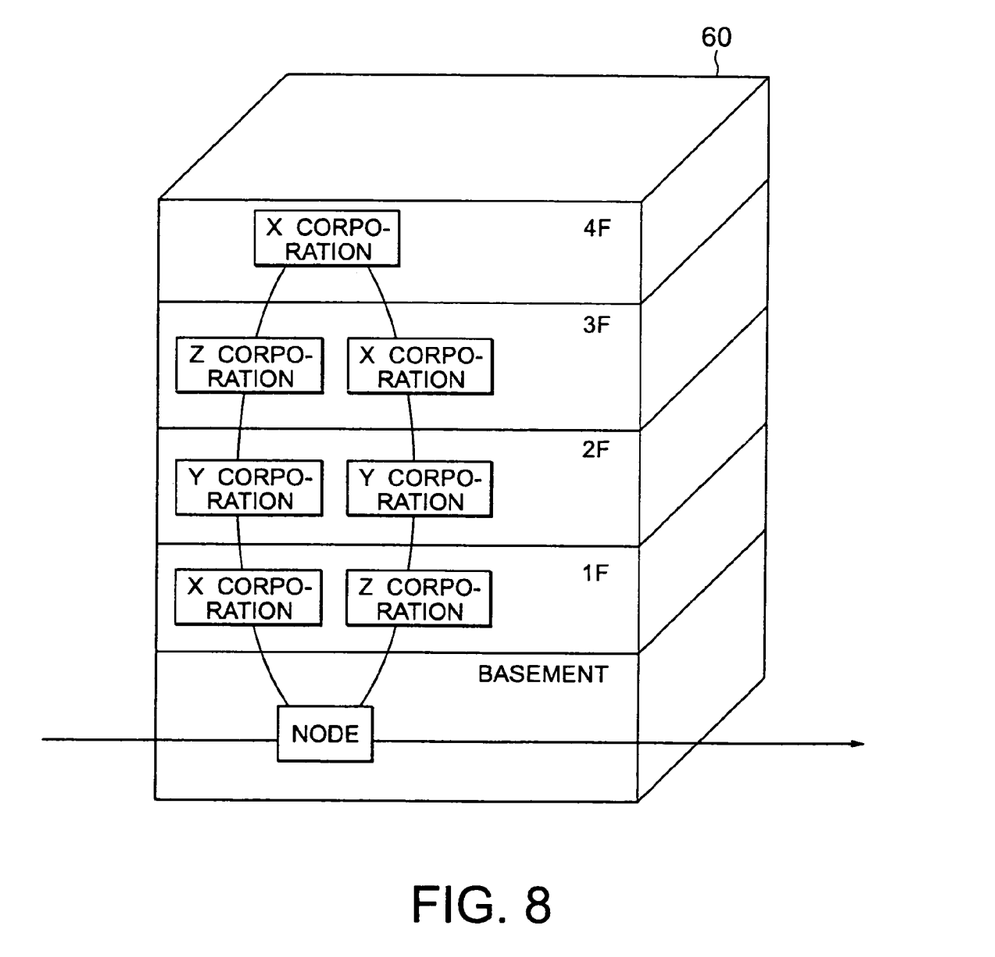
FIG. 8 is a schematic diagram showing the ring illustrated in FIG. 7 applied to a multi-tenant building.

Referring to FIG. 8, the cut-through transmission apparatus of the fourth embodiment is applied to a multi-tenant building 60.

The multi-tenant building 60 is used by a plurality of users. Specifically, an underground node is arranged on a basement. X Corporation and Z Corporation have their offices on a first floor. On a second floor, Y Corporation has its offices for two different departments. On a third floor, Z Corporation and X Corporation have their offices. On a fourth floor, X Corporation has its office.

In this embodiment, the multi-tenant building 60 has a network which comprises a shared ring connecting the offices of the above-mentioned corporations. In this ring, the underground node extracts a communication band required by the multi-tenant building 60 as a whole. After the communication band is extracted, the underground node develops communication to the ring for distribution to the offices of the respective corporations on the respective floors. Each office extracts a part of the communication required by the corporation and cuts through the remaining part of the communication for other corporations.

Thus, it is possible to reduce the functions of the node arranged at each office and to suppress the packet delay.

For example, a part of communication for the X Corporation is cut through at the office of the Y Corporation. Therefore, the office of the Y Corporation can not access to the part of communication for the X Corporation. Thus, the security is assured by executing the cut-through.

Furthermore, the X Corporation can communicate with its another office in an adjacent building through the underground node. Communication is also possible between different offices of the X Corporation within the same building.

According to this embodiment, a network cost per corporation can be reduced and management of the network is facilitated.

Figure 9:
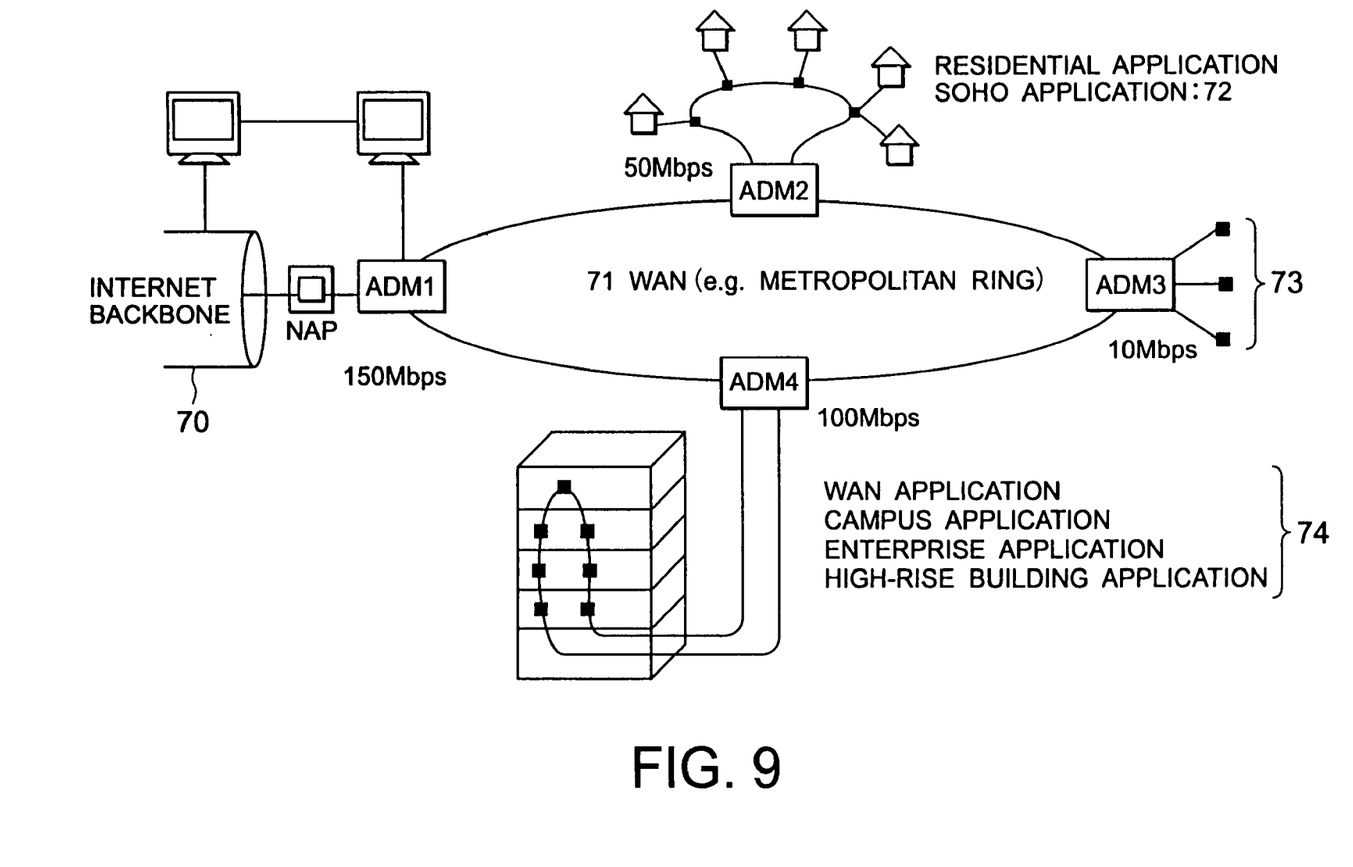
FIG. 9 is a schematic diagram showing an access network applied to the ring illustrated in FIG. 7.

Referring to FIG. 9, an access network is applied to the above-mentioned ring.

In this embodiment, the access network is developed from an internet backbone 70 through an ADM (Add/Drop Multiplexer) 1 to a WAN 71 such as a metropolitan ring.

In the embodiment illustrated in FIG. 9, the WAN 71 as a whole has a throughput of 150 Mbps. The WAN 71 is connected through an ADM2 to a throughput of 50 Mbps for a first area 72 where residences and SOHOs are concentrated, through an ADM3 to a throughput of 10 Mbps for a second area 73 where small sites are distributed, and through an ADM4 to a throughput of 100 Mbps for a third area 74 where high-rise buildings, molls, campuses are concentrated.

For example, in the first area 72, communication of the throughput of 50 Mbps among 150 Mbps is carried out through the ADM2. For the remaining 100 Mbps, no communication is performed.

Similarly, in the second area 73, communication of 10 Mbps is carried out through the ADM3. In the third area 74, communication of 100 Mbps is carried out through the ADM4. In other words, in the second area 73, the remaining throughput of 140 Mbps is cut through via the ADM3. In the third area 74, the remaining throughput of 50 Mbps is cut through via the ADM4.

Thus, it is possible to save the functions of each of ADMs 2, 3, and 4, to minimize the network delay as a whole, and to assure the security.

In each of the foregoing embodiments, the packets are dealt with. The packets are, for example, multiplexed in the add packet inserting section 43 of the cut-through transmission apparatus illustrated in FIG. 6. Alternatively, the packets may be replaced by cells which are cell-multiplexed. In this event also, the effect similar to that obtained in the foregoing embodiments can be achieved.

In the foregoing embodiments, the SDH path is used. Alternatively, the SDH path may be replaced by a PDH (plesiochronous digital hierarchy) path or a WDM (wavelength division multiplexing) path.

As described above, in the cut-through transmission apparatus or the cut-through transmission method according to this invention, the signal to be hopped to the next node is cut through in the first or the second layer while only those packets to be dropped at this node are sent to the third layer. Therefore, it is possible to considerably save the operation in the third layer, i.e., the routing operation and to reduce the load imposed upon the router forming the third layer.

In case where the cut through is carried out in the second layer, the cut through is carried out without terminating the first layer. Therefore, the operation required to terminate the first layer (for example, pointer processing upon terminating the VT1.5) is unnecessary. This makes it possible to considerably save the functions.

What is claimed is:

1. A node for routing data on a transmission network, the transmission network comprising one or more network paths, the node comprising data processing layers associated with the one or more network paths, the data processing layers comprising first, second, and third layers, said second layer being between said first layer and said third layer in said layering and said first layer comprising at least Virtual Tributary level (VT), the node performing a cut-through transmission operation comprising:

mapping a packet received from the network in said first layer;

said first layer judging whether the packet is to be dropped at said node or to be hopped to a next node;

said first layer transmitting the packet to said third layer which performs routing operations through said second layer when said first layer judges that the packet is to be dropped at said node; and said first or second layer transmitting the packet to said next node when said first layer judges that the packet is to be hopped, where the packet is transmitted without terminating the first layer.

2. A transmission method carried out in a node for routing data on a transmission network, the transmission network comprising one or more network paths, the node comprising data processing layers associated with the one or more network paths, the data processing layers comprising first, second, and third layers, said second layer being between said first layer and said third layer in said layering and said first layer comprising at least Virtual Tributary level (VT), the node performing a cut-through transmission operation, comprising the steps of:

judging, in said first layer where a packet is mapped, whether said packet is to be dropped at said node or to be hopped to a next node; and transmitting in said first layer the packet to said third layer which performs routing operations through said second layer when said first layer judges that the packet is to be dropped at said node; and said first or second layer transmitting the packet to said next node when said first layer judges that the packet is to be hopped, where the packet is transmitted without terminating the first layer.

* * * * *